May 25, 1943.  R. W. E. MOORE  2,320,093
ELECTRICAL BUSWAY
Filed Jan. 27, 1942  3 Sheets-Sheet 1

INVENTOR
Ralph W. E. Moore
BY Pennie, Davis, Marvin and Edmonds
ATTORNEYS

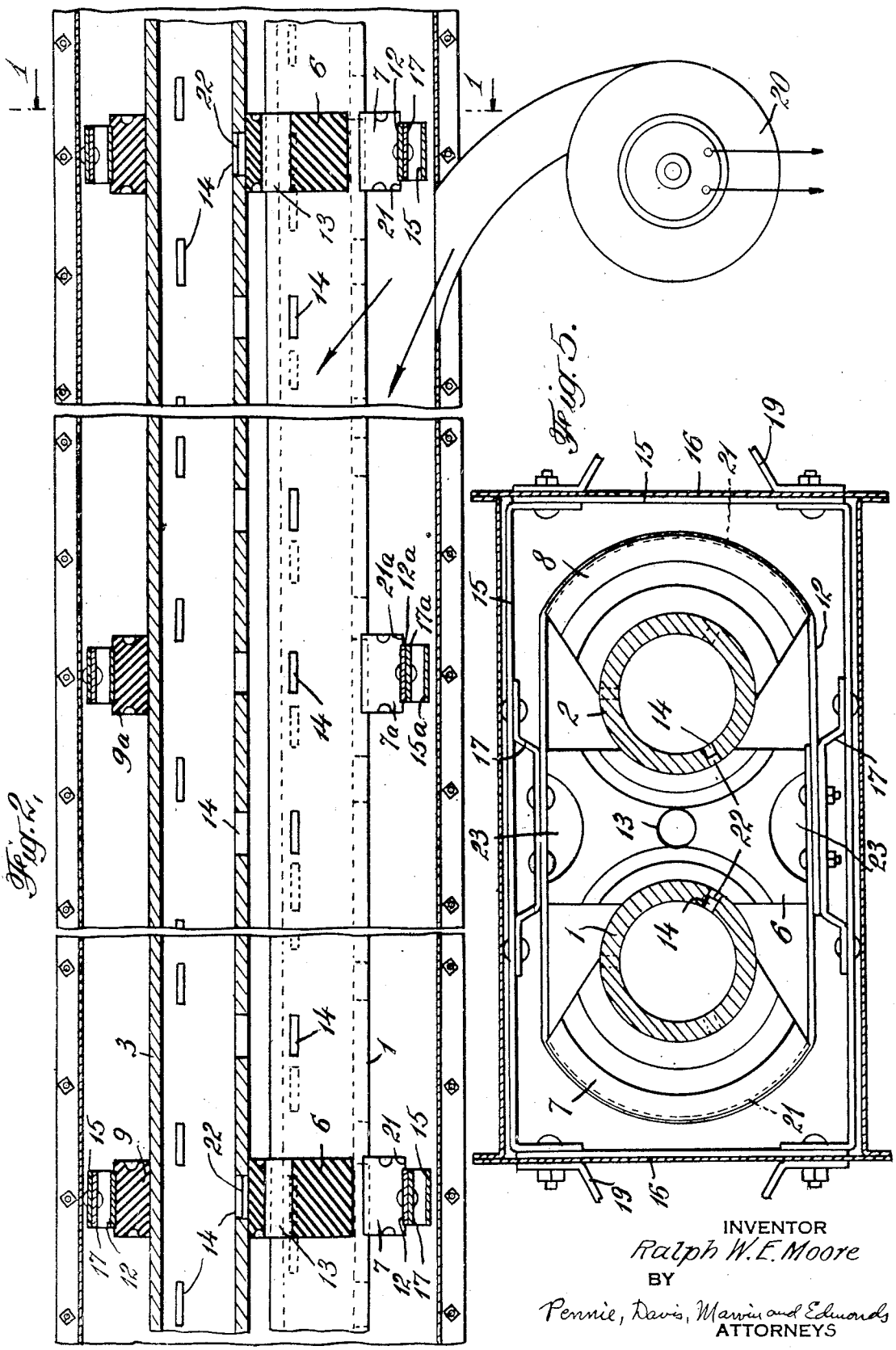

May 25, 1943.   R. W. E. MOORE   2,320,093
ELECTRICAL BUSWAY
Filed Jan. 27, 1942   3 Sheets-Sheet 3

INVENTOR
Ralph W. E. Moore
BY
Pennie, Davis, Marvin and Edmonds
ATTORNEYS

Patented May 25, 1943

2,320,093

UNITED STATES PATENT OFFICE 2,320,093

ELECTRICAL BUSWAY

Ralph W. E. Moore, Pittsburgh, Pa., assignor to National Electric Products Corporation, a corporation of Delaware Application January 27, 1942, Serial No. 428,351

30 Claims. (Cl. 174—16)

This invention relates to electrical distribution systems, more especially to those of the busway type, viz., wherein a plurality of bus bars are run parallel to each other within an enclosing duct.

The system according to the invention includes novel constructional features and arrangements which provide many important advantages among which may be included: increased electrical transmission efficiency by decrease of reactance, skin effect and insulation losses, increase of mechanical strength and resistance to damage particularly under overload or short-circuit conditions, improved heat dissipation, adaptability to more efficient and simplified electrical and mechanical connections, ease of alteration and expansion of the system to meet new requirements, and decreased cost of material and of installation.

Briefly, the preferred construction of bus bar structure hereinafter described in detail includes two or more bare tubular conductors, a central separating insulator shaped to conform to the surfaces of the conductors with which it is in contact and serving to space the conductors close together in parallel arrangement, a set of retaining insulators one adjacent each conductor, each shaped on one side to conform to the surface of the conductor to which it is adjacent and so positioned that a line through its center of contact passes through the center of contact of the separating insulator, and binding means such as a strap drawn about the retaining insulators to apply compression along the mentioned line sufficient to retain the conductors and all of the insulators together as a unit, this strap being preshaped to restrain the conductors against separation under overload or short-circuit conditions.

The invention also includes a bus bar structure as above described, enclosed in a duct formed of side walls supported preferably by transverse frames spaced at intervals, the above-mentioned binding means being secured to certain of these frames which in turn are adapted to be supported by a building structure. Thus the bus bar structure is a self-sustaining unit and it is supported by the building structure independently of the duct walls, and without substantially impeding circulation of air.

Although this invention is useful in distribution systems for either direct current or alternating current, it offers more advantages for the latter. In alternating current distribution systems three-phase service predominates, and therefore three-conductor bus bar arrangements and multiples thereof have the greatest applicability. Heretofore, it has been customary, even in enclosed busways, to run the bus bars parallel with their centers on the same straight line. Furthermore, it has been customary to employ conductors of solid, wide, flat bars. By running such bus bars in pairs, a decrease in reactance losses has resulted, but this decrease has not been so great as would be desired because the spacing between the extreme pairs of bus bars is necessarily much greater than the spacing between adjacent bars. Thus the efficiency of such bus bar structure is less than might be supposed. Furthermore, the wide, flat bars heretofore used, being about ¼" thick, are readily distorted as a result of short-circuit, by reason of which a large number of heavy and expensive insulators have been required to withstand overload and short-circuit stresses.

On the other hand, consideration of the structure of the present invention will show that the several disadvantages of the prior bus bar structures have been overcome, at the same time being stronger and more readily adapted to alteration and expansion, and cheaper than the prior arrangements, both as to material and as to installation cost.

A better understanding of the invention may be had from a consideration of the following specification taken together with the drawings, wherein:

Fig. 2 is a longitudinal view of the busway taken along the line 2—2 of Fig. 1;

Fig. 5 shows a busway according to the present invention comprising a duct enclosing a bus bar structure including two tubular conductors.

Figure 1:
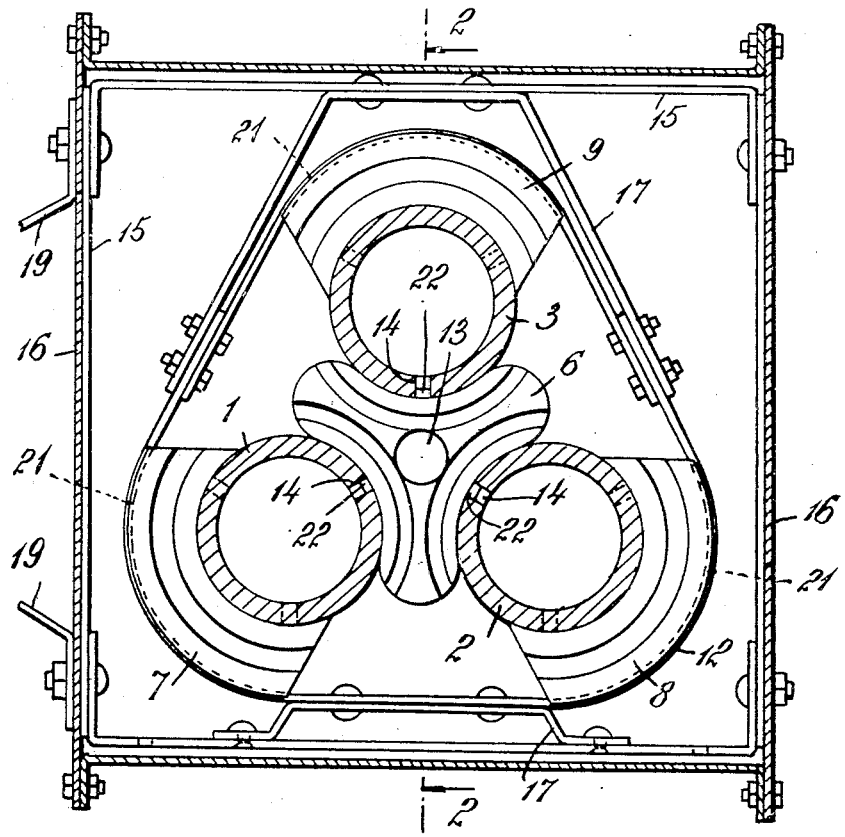
Fig. 1 shows in cross-section a busway according to the present invention wherein a bus bar structure having three conductors is employed.

The invention, as illustrated in Fig. 1, comprises a unitary bus bar structure of three parallel conductors spaced close together and formed of round, bare tubing, although it is not limited to conductor material of that formation. Tubing known as extra heavy copper pipe is suitable, and of this the 2-inch size has a tubular wall thickness of slightly over ⅕ inch. Hollow conductor is preferable in order to attain maximum cooling and current-carrying capacity with minimum copper, and round conductor is preferable because it is symmetrical, strong and readily obtainable, and is adapted for use with existing terminals, tapered screw couplings and other fittings. The conductors are spaced apart by a central, star-shaped separating insulator 6, so as to run parallel, close together and substantially at the points of an equilateral triangle.

Because the conductors themselves are symmetrical, i. e., round, the structure is symmetrical both mechanically and electrically. From this follows not only mechanical simplicity and increased strength of structure, but also a decrease in losses due to reactance and to skin effects because all three conductors are always spaced at minimum and equal distances from each other, no transpositions being required to attain a perfect balancing of the phase voltages. This central insulator is not subject to any appreciable compression and therefore may be made of relatively inexpensive molded composition, such as asbestos and asphalt. The surfaces of this insulator are shaped, as shown, to conform to the shape of the adjacent surfaces of the conductors. To comply with the code, the central insulator should be formed so as to space the conductors not closer than one inch between the nearest points on their surfaces, although even closer spacing would further reduce the reactance losses. With conductors of the diameter mentioned, this insulator may itself be about 1 inch to 1⅜ inches thick.

On the portions of the surfaces of the conductors diametrically opposite those in contact with the separating insulator are placed retaining insulators 7, 8 and 9, likewise having surfaces conforming to those of the adjacent surfaces of the conductors with which they are in contact. The retaining insulators will, especially under short-circuit or under severe overload conditions, be subjected to considerable compressive force and therefore should be of sufficiently strong material. Porcelain or a composition of wax-impregnated cement is suitable material for the retaining insulators. About these insulators is drawn binding means 12 such as a strap the ends of which are suitably joined by bolts or rivets, as shown. This strap might, for example, be of steel 1¼ inches wide and ¼ to ⅜ of an inch thick, depending upon how many conductors are to be bound together into the bus bar structure. According to the preferred embodiment of the invention, the strap should be preshaped, viz., it should assume a form when it is drawn about the retaining insulators sufficiently to hold the conductors, the retaining insulators and the corresponding separating insulator if any, together in a unitary structure such that no substantial bending of the strap can result when the strap is subjected to the considerable tension caused by the tendency of the conductors to separate under short-circuit conditions. By this arrangement, the center of contact area of each retaining insulator is on a pressure line bisecting a different point of the mentioned triangle, and these three lines after passing through the conductors intersect at the center of the separating insulator, resulting in a balance of the mechanical forces involved.

From the foregoing it will be clear that if a series of the described sets of insulators and binding straps are spaced at intervals along the run of the conductors, there will result a self-sustaining unitary bus bar structure capable in itself of withstanding overload and short-circuit stresses substantially without distortion.

In Fig. 1, the bus bar structure is shown in combination with a duct having rectangularly shaped transverse frames spaced at such intervals that certain of the frames are located opposite the binding straps so that suitable brackets 17 may secure the binding straps 12 to the frames 15. Thus the bus bar structure is entirely supported by such frames. These frames 15 in turn may be suspended from or supported by the structure of the building in connection with which such busways are most commonly employed, by conveniently shaped hangers 19 bolted or otherwise secured to the frames.

Forming the duct which encloses the bus bar structure are four wall members 16 which are suitably fastened together and to the transverse frames 15 which support and reinforce them. These walls may conveniently be formed of two pieces with upturned ends and two flat pieces, as shown in the drawing, so that when bolted or screwed together they form a rectangular section of the required length. It will be noted that this busway construction relieves the wall members of all mechanical load, except that of their own weight. The duct, including frame members 15, is preferably constructed as described in copending application of John E. Huguelet, Serial No. 385,911, filed March 29, 1941. Although the duct construction there shown is especially advantageous in combination with the present bus bar structure, other types of duct and duct of any suitable shape could be employed.

It is convenient, especially in connection with the assembly of the busway above described, that the separating insulators 6 and the retaining insulators 7, 8 and 9 remain in their correct positions in a given transverse plane while the binding strap 12 is being secured in place. To this end suitable anchoring means 21 and 22 may be provided, the first to anchor the retaining insulators and binding strap together, and the second to anchor the separating insulators and tubular conductors together. If desired, additional anchoring means may be provided between the retaining insulators and the conductors. Such anchoring means 21 may comprise suitable shoulders on the edges of the retaining insulator spaced to accommodate the width of the strap. Suitable anchoring means 22 between the separating insulator and conductor (or between the retaining insulator and the conductor) may comprise a small post or projection molded on the surface of that insulator and shaped to fit into a corresponding aperture in the conductor. Alternatively, short conical pins of a hard metal may be molded into the surface of the insulator so that the points of these pins will sink into the surface of the conductor. The concentric lines drawn on the representation of the insulators in Fig. 1 (and also in the other figures) indicate corrugations formed in the surfaces of the insulators to increase the length of the creepage surface between adjacent metal portions of the assembly. Some of these corrugations are shown more clearly in Fig. 2.

In order to provide ventilation through the walls of the conductors a plurality of apertures 14 are made through the wall of each conductor. These should preferably be staggered along the axis and around the periphery of the conductor and should be shaped with the longer dimension longitudinally of the conductor and with the shorter dimension transversely of the conductor. In this manner the cross-section of conducting metal at any given plane will be decreased by the apertures to a minimum, while a maximum of ventilating aperture area is retained. In the drawings these ventilating apertures are shown to be spaced radially 120°. If at least three apertures are spaced equidistantly around the periphery of the conductor there will always be a number of them near the top and near the bottom of the conductors, regardless of the plane in which the conductors run, thus aiding in the ventilation of the inside of the conductors. More apertures, if necessary, could be provided.

The ventilation and heat dissipation are enhanced, according to the present invention, not only by provision of the apertures 14 through the walls of the conductors, but also by means of several other constructional features, among which may be included the provision of a hole 13 through the center portion of the separating insulator 6, the shaping of insulators 6, 7, 8 and 9 to cover only a portion of the surface of the conductors and so as to allow as much free air passage therearound as possible, and by the use of binding straps 12 and supporting brackets 17 of such proportions as to minimize impedance to flow of air along the duct. Suitable openings, such as louvers, through the walls 16 of the ducts may be provided to enhance natural ventilation by convection, although in many locations the National Electric Code would prohibit such openings. If natural ventilation, especially due to temporary emergency conditions, is inadequate to prevent overheating of the conductors, a blower may be provided to force the circulation of air through the duct as indicated in Fig. 2, which will now be described.

Fig. 2, being a longitudinal view through the line 2—2 of Fig. 1, shows a run of three-conductor bus bar structure in a duct, and illustrates one manner of spacing between the successive sets of insulators appropriate in connection with the invention. At each end of the figure is a set of insulators including a central separating insulator 6 and the retaining insulators 7, 8 (not shown), 9 together with a binding strap 12, as in Fig. 1. In a bus bar structure which uses conductors of, say, 2 inches in diameter, the spacing between these two sets of insulators may be of the order of 48 inches. Midway between these two sets of insulators is a set of retaining insulators 7a, 8a (not shown), 9a and a binding strap 12a, but no separating insulator. The separating insulator would not ordinarily be required at this point because, as above explained, the tubular conductors are quite stiff, and separating insulators are required only to separate and space the conductors correctly, there being no tendency for the conductors to approach each other except as a result of such flexibility as they possess. However, the tendency of the conductors to fly apart during extreme overload conditions, as in the case of a short-circuit, is very great, and, therefore, to assure that the bus bars will not be distorted under overload conditions the additional binding means comprising binding strap 12a and retaining insulators 7a, 8a, 9a, may advantageously be spaced intermediate the sets of insulators which include a separating insulator.

In Fig. 2 a blower 20 is shown connected into a wall 16 of the duct to supplement the natural ventilation due to convection currents. If the motor which operates this blower be connected to the electric circuit carried by the duct which it ventilates, the blower will operate automatically whenever the duct is subject to heating.

Figure 3:
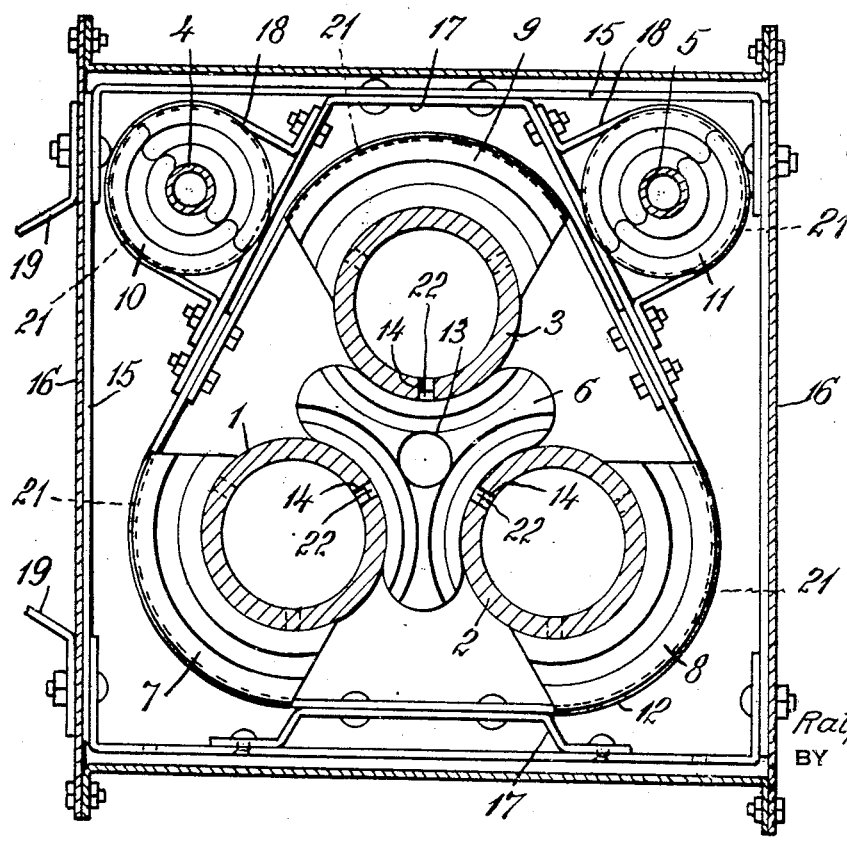
Fig. 3 shows a construction similar to that of Fig. 1 except that it additionally includes a divided neutral conductor.

The busway shown in Fig. 3 is the same as that of Fig. 1 with the exception that it includes a divided neutral conductor comprising conductors 4 and 5. These conductors, as represented in the figure, also are of round copper tubing, each half the size of a suitable single conductor, and may be supported in split insulators 10 which, in turn, are secured to the binding straps 17 by clamps 18. These neutral half-size conductors may also be furnished with apertures for ventilating the inside surfaces thereof, as explained in connection with Fig. 1, although this would not usually be required because neutral conductors carry current only when the load is unbalanced.

These two conductors are ordinarily connected in parallel so that electrically they comprise one conductor. The advantage of using two conductors of half size is that there is usually room for such conductors together with their necessary supporting insulators and retaining clamps in the spaces between the binding straps 17 and the walls 16 of the duct, as shown. Furthermore, this arrangement is preferable in that the electrical and mechanical stresses will be balanced in the event of overload. The neutral could, of course, be run as a single conductor if space be provided in the duct to accommodate it.

Figure 4:
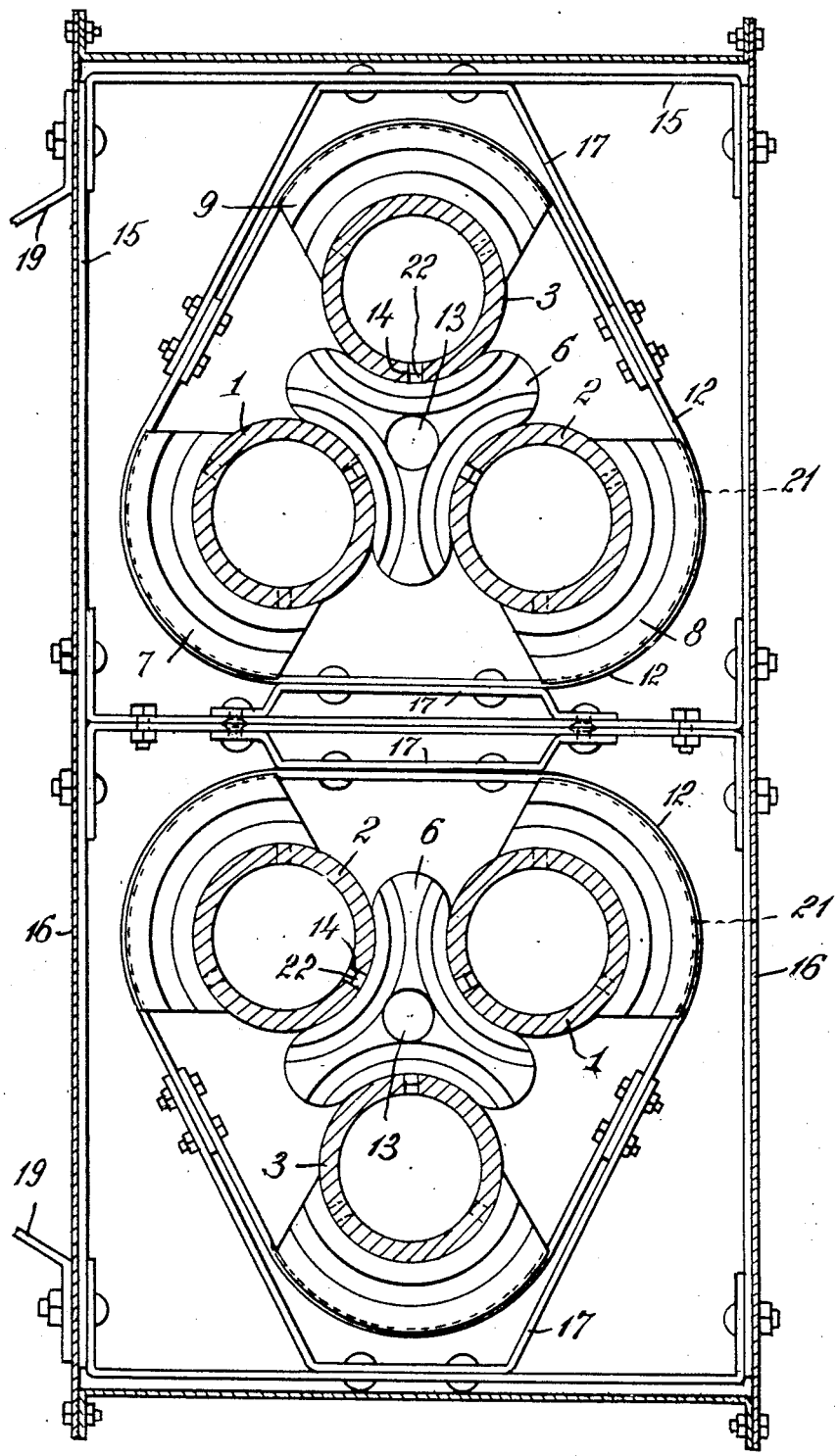
Fig. 4 illustrates a modification of the arrangement of Fig. 1 wherein the bus bar structure of that figure is duplicated within a single duct to provide a system of doubled capacity.

It has been pointed out above that one of the advantages of the system in accordance with the present invention resides in its adaptability to alteration, and especially expansion in the event that additional power demand arises. Fig. 4 illustrates one modification of the invention by which a doubling of the facilities may be effected by combining a duplicate bus bar structure with that previously installed. It will be seen by a comparison of Figs. 1 and 4 that to accomplish this requires merely removing the lower wall member 16 shown in Fig. 1 and bolting to the lower frame member then exposed, a duplicate transverse frame 15 in which is secured the duplicate bus bar structure. The duct is then enclosed as before with additional wall members 16. Suitable hangers 19 may of course be provided as required.

The modification of the invention illustrated in Fig. 5 comprises a busway in which only two conductors are employed. Such a busway is useful in single-phase alternating current systems and also in direct-current systems. The elements of the structure here shown are almost all identical with those shown in the previous figures where they are designated by the same reference characters, and, therefore, require no further description. The principal difference between the system of Fig. 5 and those previously described resides in the shape of separating insulator 6 which, being adapted to separate only two round tubular conductors, is proportioned accordingly. Separating insulator 6, in addition to accommodating a central hole 13 to enhance ventilation, may be formed with cutout portions 23 for the same purpose. A four-conductor bus bar structure according to the invention may be had by forming the central separating insulator 6 of Fig. 5 in the shape of a square so that the conductors are spaced equilaterally at the corners of a square; or it may be formed more nearly as shown, the cutout portions 23 being shaped to fit the third and fourth conductors, and the retaining strap being preshaped accordingly.

The two-conductor bus bar structure according to Fig. 5 may also conveniently be employed in combination with a previously installed busway. Thus, because of the standardization of component parts and fittings in accordance with the present invention it will be clear that a busway, such as shown for example in Fig. 1, may readily be expanded after the manner described in connection with Fig. 4, by adding thereto a two-conductor strucure as shown in Fig. 5. Many other combinations of bus bar structure units within this invention will occur to those skilled in the art.

What is claimed is:

1. An electrical distribution system busway which includes in combination three parallel bare round tubular conductors, a separating insulator having three faces conforming respectively to the surface of each conductor where said insulator is in contact therewith and proportioned to space said conductors close together in substantially equilateral arrangement at any given section, a retaining insulator positioned on each conductor at a portion of the surface thereof diametrically opposite that in contact with said separating insulator, a strap secured about said retaining insulators preshaped to bind said conductors and all of said insulators together as a unitary bus bar structure capable in itself of withstanding short-circuit stresses substantially without distortion, a duct extending coaxially with and enclosing said bus bar structure, a supporting frame for said duct adapted to be secured to a building structure, and bracket means securing said strap to said frame serving to support said bus bar structure without substantially impeding airflow in said duct.

2. An electrical distribution system busway which includes in combination three bare tubular conductors, a separating insulator having a separate face in contact with a portion of the surface of each of said conductors respectively and positioned to space said conductors close together in parallel substantially equilateral arrangement at any given section, a retaining insulator positioned on each conductor at a portion of the surface thereof substantially opposite that in contact with said separating insulator, binding means secured about said retaining insulators preshaped to bind said conductors and all of said insulators together as a unitary insulated bus bar structure capable in itself of withstanding short-circuit stresses substantially without distortion, a duct having walls enclosing said bus bar structure, a transverse frame in said duct serving to support said walls and adapted to be secured to a building structure, and means securing said binding means to said frame whereby said bus bar structure is supported independently of the walls of said duct.

3. An electrical distribution system busway which includes in combination three bare tubular conductors, a separating insulator having a separate face in contact with a portion of the surface of each of said conductors respectively and positioned to space said conductors close together in parallel substantially equilateral arrangement at any given section, a retaining insulator positioned on each conductor at a portion of the surface thereof substantially opposite that in contact with said separating insulator, binding means secured about said retaining insulator preshaped to bind said conductors and all of said insulators together as a unitary insulated bus bar structure capable in itself of withstanding short-circuit stresses substantially without distortion, a plurality of apertures through the walls of said conductors positioned along and around the periphery of said conductors so as to provide ventilation therethrough, a duct having walls enclosing said bus bar structure, a transverse frame in said duct serving to support said walls and adapted to be secured to a building structure, and means securing said binding means to said frame serving to support said bus bar structure independently of the walls of said duct without substantially impeding airflow in said duct.

4. An electrical distribution system busway which includes in combination a plurality of round conductors, a central separating insulator shaped to conform to portions of said conductors with which said insulator is in contact and proportioned to space said conductors close together in substantially equilateral arrangement at any given section, a set of retaining insulators, one insulator of said set being positioned on each conductor at a portion thereof substantially opposite that in contact with said separating insulator, binding means serving to bind said set of retaining insulators, said conductors and said separating insulator together to form an insulated bus bar structure, said binding means being shaped into the form it would assume under tension resulting from circuit conditions tending to cause said conductors to separate, a duct having walls enclosing said bus bar structure and spaced therefrom to enhance airflow, a frame for said duct serving to support said walls and adapted to be secured to a building structure, and means securing said binding means to said frame serving to support said bus bar structure independently of the walls of said duct without substantially impeding airflow in said duct.

5. A busway according to claim 4 wherein said central separating insulator is formed with a hole therethrough to enhance longitudinal airflow in said duct.

6. A busway according to claim 4 wherein a plurality of said central separating insulators are spaced at intervals along the run of said conductors, and a plurality of sets of retaining insulators and binding means are spaced along said run at intervals at least as frequent as those corresponding to said separating insulators.

7. A busway system according to claim 4 in which said plurality of conductors are run parallel to each other and at least one neutral conductor is run in said duct parallel to said plurality of conductors and is secured to and supported by said binding means.

8. A busway system according to claim 4 in which said plurality of conductors are run parallel to each other and a divided neutral conductor comprising two half-size conductors are run in said duct parallel to and symmetrical with said plurality of conductors and are secured to and supported by said binding means.

9. An electrical distribution system busway which includes in combination three bare round tubular conductors, a plurality of symmetrically shaped separating insulators distributed at intervals along said conductors, each separating insulator having a face in contact with a portion of the adjacent surface of each of said conductors, respectively, and being proportioned to space said conductors close together parallel to one another and substantially at the points of an equilateral triangle, a plurality of sets of retaining insulators positioned one insulator on the outside of each conductor, a binding strap secured about each set of retaining insulators to bind said set of retaining insulators, said conductors and one of said separating insulators together as a unitary bus bar structure capable in itself of withstanding overload stresses substantially without distortion, said strap being preshaped into the form it would assume under tension resulting from the tendency of said conductors to separate under short-circuit conditions, anchoring means cooperating with said conductors and said separating insulators for retaining said insulators in position with respect to said conductors, additional anchoring means cooperating with said straps and said retaining insulators for restraining said retaining insulators against longitudinal movement along said conductors, additional sets of retaining insulators and binding straps therefor distributed at intervals along said conductors between said separating insulators, a plurality of apertures through the wall of each conductor staggered along the axis and around the periphery of said conductor so as to provide ventilation therethrough, said apertures being shaped with a long dimension longitudinally of the conductor and with a short dimension transversely of the conductor, a duct having walls enclosing said bus bar structure and spaced therefrom to enhance airflow, transverse frames for said duct serving to support said walls and adapted to be secured to a building structure, and means securing said straps to said frames serving to support said bus bar structure independently of the walls of said duct without substantially impeding airflow in said duct.

10. A bus bar structure which includes a plurality of bare tubular conductors, a central separating insulator shaped to conform to portions of the surfaces of said conductors with which it is in contact and proportioned to separate and to space said conductors close together in parallel arrangement, a set of retaining insulators, one insulator of said set being positioned on each conductor, respectively, at a portion thereof substantially opposite that in contact with said separating insulator, and binding means drawn about said retaining insulators to retain said conductors and all of said insulators together as a unit and preshaped to restrain said conductors against separation under short-circuit conditions.

11. A bus bar structure which includes a plurality of bare tubular conductors, a central insulator shaped to conform to portions of the surfaces of said conductors with which it is in contact and serving to separate and to space said conductors close together in parallel arrangement, a plurality of retaining insulators one adjacent each conductor, each retaining insulator being shaped on one side to conform to the surface of the conductor to which it is adjacent and positioned on said conductor substantially opposite a portion of said central insulator which is in contact with said conductor, and a binding strap drawn about said retaining insulators to retain said conductors and all of said insulators together as a unit and shaped to restrain said conductors against separation.

12. A bus bar structure which includes three bare tubular conductors, a star-shaped central separating insulator having faces conforming to the surfaces of said conductors where said insulator is in contact therewith and positioned to space said conductors apart in parallel substantially equilateral arrangement at any given section, three retaining insulators each being adjacent a conductor and having one face shaped to conform to the conductor to which it is adjacent and so positioned that pressure lines passing through said faces and through said conductors intersect at the center of said separating insulator, a binding strap drawn about said retaining insulators and shaped to retain said conductors and all of said insulators together as a unit, and anchoring means cooperating with said strap and said retaining insulators for restraining said retaining insulators against longitudinal movement along said conductors.

13. A bus bar structure which includes three bare tubular conductors, a star-shaped central separating insulator having faces conforming to the surfaces of said conductors where said insulator is in contact therewith and positioned to space said conductors apart in parallel substantially equilateral arrangement at any given section, three retaining insulators each being adjacent a conductor and having one face shaped to conform to the conductor to which it is adjacent and so positioned that pressure lines passing through said faces and through the centers of said conductors intersect at the center of said separating insulator, a binding strap drawn about said retaining insulators and shaped to retain said conductors and all of said insulators together as a unit, anchoring means cooperating with said conductors and said separating insulator for retaining said insulator in position, and additional anchoring means cooperating with said strap and said retaining insulators for restraining said retaining insulators against longitudinal movement along said conductors.

14. A bus bar structure which includes three bare tubular conductors, a plurality of symmetrically shaped separating insulators distributed at intervals along said conductors, each separating insulator having a face in contact with a portion of the adjacent surface of each of said conductors, respectively, and being proportioned to space said conductors close together parallel to one another and substantially at the points of an equilateral triangle, a plurality of expansion-preventing means distributed at intervals along said conductors, each of said expansion-preventing means comprising a set of retaining insulators positioned one on the outside of each conductor, the area of contact of each retaining insulator being pierced by a line bisecting a point of said triangle, and binding means secured about each set of retaining insulators preshaped to bind said conductors and all of said insulators together as a unitary insulated bus bar structure capable in itself of withstanding short-circuit stresses substantially without distortion, and means attached to certain of said binding means for securing said bus bar structure to a supporting structure.

15. A bus bar structure which includes three bare tubular conductors, a plurality of symmetrically shaped separating insulators distributed at intervals along said conductors, each separating insulator having a face in contact with a portion of the adjacent surface of each of said conductors, respectively, and being proportioned to space said conductors close together parallel to one another and substantially at the points of an equilateral triangle, a plurality of expansion-preventing means distributed at intervals along said conductors, each of said expansion-preventing means comprising a set of retaining insulators positioned one on the outside of each conductor, the area of contact of each retaining insulator being pierced by a line bisecting a point of said triangle, and binding means secured about each set of retaining insulators, certain of said expansion-preventing means being located in the same plane with said separating insulators and the remainder of said expansion-preventing means being located along said conductors intermediate the planes of said separating insulators, whereby to bind said conductors together as a unitary insulated bus bar structure capable in itself of withstanding short-circuit stresses substantially without distortion, and means attached to certain of said binding means for securing said bus bar structure to a supporting structure.

16. A bus bar structure which includes a plurality of round conductors, a central insulator shaped to conform to portions of the surfaces of said conductors with which it is in contact and proportioned to separate and to space said conductors close together in parallel arrangement, a set of retaining insulators, one insulator of said set being positioned on each conductor, respectively, at a portion thereof substantially opposite that in contact with said separating insulator, and binding means drawn about said retaining insulators to bind said set of retaining insulators, said conductors and said separating insulator together to form a unitary insulated bus bar structure, said binding means being preshaped into the form it would assume under tension resulting from the tendency of said conductors to separate under short-circuit conditions.

17. A bus bar structure which includes three round conductors, a symmetrically shaped central separating insulator having a face in contact with a portion of the adjacent surface of each conductor, respectively, and being proportioned to space said conductors close together parallel to one another and substantially at the points of an equilateral triangle, a set of three retaining insulators positioned one on the outside of each conductor, the area of contact of each retaining insulator being on a line bisecting a point of said triangle, binding means serving to bind said set of retaining insulators, said conductors and said separating insulator together to form a unitary insulated bus bar structure, said binding means being shaped into the form it would assume under tension resulting from circuit conditions tending to cause said conductors to separate, and means for securing said binding means to a supporting structure.

18. A bus bar structure according to claim 17 in which a plurality of said central separating insulators are spaced at intervals along the run of said conductors, the thickness of each of said separating insulators being of the order of magnitude of the spacing between said conductors, and in which a plurality of sets of retaining insulators and binding means are spaced along said run at intervals at least as frequent as those corresponding to said separating insulators.

19. A bus bar structure which includes a plurality of tubular conductors, a central insulator proportioned to separate and to space said conductors close together, one each of a plurality of portions of said insulator being in contact, respectively, with said conductors, a set of retaining insulators, an insulator of said set being positioned on each conductor, respectively, at a portion of said conductor substantially opposite that in contact with said central insulator, and binding means drawn about said retaining insulators to retain said conductors and all of said insulators together as a unit, said binding means being shaped into the form it would assume under tension resulting from circuit conditions tending to cause said conductors to separate.

20. A bus bar structure which includes a plurality of tubular conductors, a central insulator shaped to be in contact with and proportioned to separate and to space said conductors close together in parallel arrangement, a set of retaining insulators, an insulator of said set being positioned on each conductor, respectively, at a portion thereof substantially opposite that in contact with said central insulator, and binding means drawn about said retaining insulators to retain said conductors and all of said insulators together as a unit, said binding means being shaped into the form it would assume under tension resulting from circuit conditions tending to cause said conductors to separate.

21. A bus bar structure which includes a plurality of tubular conductors positioned in an arrangement having a geometrical center at a given section, a set of retaining insulators, an insulator of said set being positioned on each conductor so that pressure lines passing through said insulators and said conductors lie in the plane of said section and intersect at said center, and binding means drawn about said set of insulators to retain said conductors and said insulators together as a unit, said binding means being preshaped to restrain said conductors against separation under short-circuit conditions.

22. A bus bar structure which includes three tubular conductors, a symmetrical central separating insulator having faces in contact with said conductors and positioned to space said conductors apart in substantially equilateral arrangement at any given section, three retaining insulators each being adjacent a conductor and having a face in contact with the conductor to which it is adjacent and so positioned that pressure lines passing through said faces and through said conductors intersect at the center of said separating insulator, a binding strap drawn about said retaining insulators and shaped to retain said conductors and all of said insulators together as a unit, and anchoring means cooperating with said strap and said retaining insulators for restraining said retaining insulators against longitudinal movement along said conductors.

23. A bus bar structure which includes three tubular conductors, a symmetrical central separating insulator having faces in contact with said conductors and positioned to space said conductors apart in substantially equilateral arrangement at any given section, three retaining insulators each being adjacent a conductor and having a face in contact with the conductor to which it is adjacent and so positioned that pressure lines passing through said faces and through the centers of said conductors intersect at the center of said separating insulator, a binding strap drawn about said retaining insulators and shaped to retain said conductors and all of said insulators together as a unit, anchoring means cooperating with said conductors and said separating insulator for retaining said central insulator in position, and additional anchoring means cooperating with said strap and said retaining insulators for restraining said retaining insulators against longitudinal movement along said conductors.

24. A bus bar structure which includes a plurality of round conductors, a central insulator having faces in contact with portions of said conductors and proportioned to separate and to space said conductors close together in substantially equilateral arrangement at any given section, a set of retaining insulators, an insulator of said set being positioned on each conductor, respectively, at a portion thereof substantially opposite that in contact with said central insulator, and binding means drawn about said retaining insulators to bind said set of retaining insulators, said conductors and said central insulator together to form a unitary insulated bus bar structure, said binding means being shaped into the form it would assume under tension resulting from circuit conditions tending to cause said conductors to separate.

25. A bus bar structure which includes at least three tubular conductors, a central separating insulator having a plurality of faces one in contact with each of said conductors and positioned to space said conductors apart in substantially equilateral arrangement at any given section, at least three retaining insulators one each being adjacent a conductor and having a face in contact with the conductor to which it is adjacent and so positioned that pressure lines passing through said faces and through said conductors intersect at the center of said separating insulator, a binding strap drawn about said retaining insulators and shaped to retain said conductors and all of said insulators together as a unit, and anchoring means cooperating with said strap and with said retaining insulators for restraining said retaining insulators against longitudinal movement along said conductors.

26. A bus bar structure which includes at least three tubular conductors, a central separating insulator in contact with and proportioned to separate and space said conductors close together in substantially equilateral arrangement at any given section, at least three retaining insulators one each being adjacent a conductor and having a face in contact with the conductor to which it is adjacent and so positioned that pressure lines passing through said faces and through the centers of said conductors intersect at the center of said separating insulator, a binding strap drawn about said retaining insulators and shaped to retain said conductors and all of said insulators together as a unit, anchoring means cooperating with said conductors and with said separating insulator for retaining said separating insulator in position, and additional anchoring means cooperating with said strap and said retaining insulators for restraining said retaining insulators against longitudinal movement along said conductors.

27. An electrical distribution system busway which includes in combination a plurality of tubular conductors positioned in an arrangement having a geometrical center at a given section, a set of retaining insulators, one of said insulators being positioned on each conductor so that pressure lines passing through said insulators and said conductors lie in the plane of said section and intersect at said center, binding means drawn about said set of insulators to retain said conductors and insulators together as a unitary bus bar structure, said binding means being shaped into the form it would assume under tension resulting from circuit conditions tending to cause said conductors to separate, a duct having walls enclosing said bus bar structure and spaced therefrom, a frame for said duct serving to support said walls and adapted to be secured to a building structure, and means securing said binding means to said frame serving to support said bus bar structure independently of the walls of said duct without substantially impeding airflow in said duct.

28. An electrical distribution system busway which includes in combination at least three tubular conductors, a separating insulator having at least three faces respectively in contact with said conductors and proportioned to space said conductors close together in substantially equilateral arrangement at any given section, a retaining insulator positioned on each conductor at a portion of the surface thereof diametrically opposite that in contact with said separating insulator, a strap secured about said retaining insulators serving to bind said conductors and all of said insulators together as a unitary bus bar structure, said strap being shaped into the form it would assume under tension resulting from circuit conditions tending to cause said conductors to separate, a duct extending coaxially with and enclosing said bus bar structure, a supporting frame for said duct adapted to be secured to a building structure, and bracket means securing said strap to said frame serving to support said bus bar structure without substantially impeding airflow in said duct.

29. An electrical distribution system busway which includes in combination at least three tubular conductors, a separating insulator having at least three faces respectively in contact with said conductors and proportioned to space said conductors close together in substantially equilateral arrangement at any given section, a retaining insulator positioned on each conductor at a portion of the surface thereof diametrically opposite that in contact with said separating insulator, a strap secured about said retaining insulators serving to bind said conductors and all of said insulators together as a unitary bus bar structure, said strap being shaped into the form it would assume under tension resulting from circuit conditions tending to cause said conductors to separate, a plurality of apertures through the wall of each conductor staggered along the axis and around the periphery of said conductor so as to provide ventilation through said wall, a duct extending coaxially with and enclosing said bus bar structure, a supporting frame for said duct adapted to be secured to a building structure, and bracket means securing said strap to said frame serving to support said bus bar structure without substantially impeding airflow in said duct.

30. An electrical distribution system busway which includes in combination a plurality of round conductors, a central separating insulator shaped to be in contact with a portion of each of said conductors and proportioned to space said conductors close together in substantially equilateral arrangement at any given section, a set of retaining insulators, an insulator of said set being positioned on each conductor at a portion thereof substantially opposite that in contact with said separating insulator, binding means serving to bind said set of retaining insulators, said conductors and said separating insulator together to form a unitary insulated bus bar structure, said binding means being shaped into the form it would assume under tension resulting from circuit conditions tending to cause said conductors to separate, a duct having walls enclosing said bus bar structure and spaced therefrom to enhance airflow, a frame for said duct serving to support said walls and adapted to be secured to a building structure, and means securing said binding means to said frame serving to support said bus bar structure independently of the walls of said duct without substantially impeding airflow in said duct.

RALPH W. E. MOORE.